Patented Sept. 16, 1952

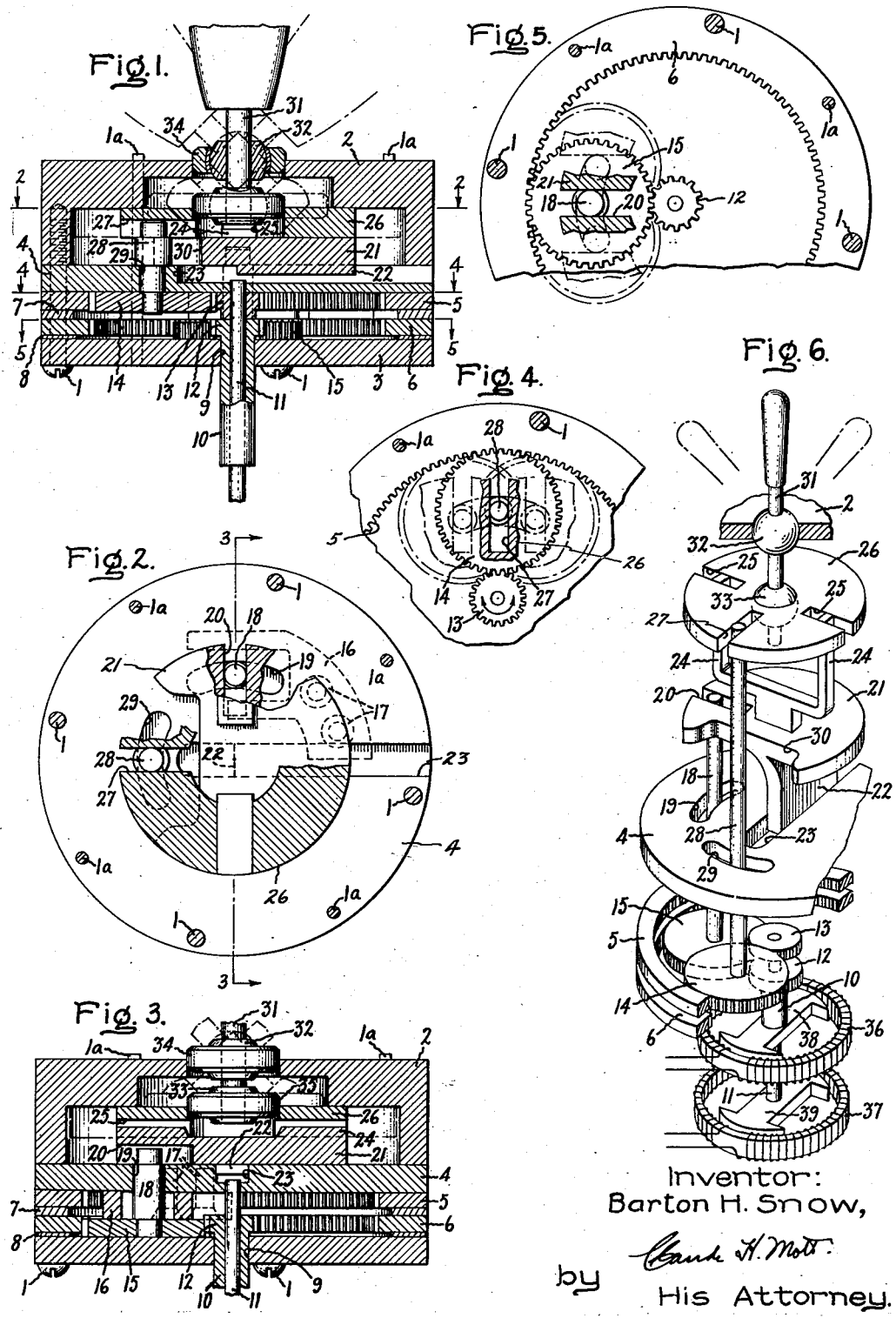

2,610,520

UNITED STATES PATENT OFFICE 2,610,520

MOTION TRANSLATING DEVICE

Barton H. Snow, Cincinnati, Ohio, assignor to General Electric Company, a corporation of New York Application September 6, 1951, Serial No. 245,283

9 Claims. (Cl. 74—471)

My invention relates to devices for translating linear motion to rotary motion or vice versa, and more particularly to devices for translating the rectangular components of motion of a universally mounted lever or "joy stick" into rotary motion of a pair of shafts or the levers thereof.

A primary object of my invention is to provide a new and improved device of the above sort in which a planetary gear system is employed to accomplish the motion translation.

Another object of my invention is to provide such a device having a dependable neutral or null position.

A further object of my invention is to provide a very compact device of the above sort.

Still a further object of my invention is to provide such a device which is mechanically simple, easy to assemble, and inexpensive in cost.

In carrying out my invention in one form thereof, I provide a motion translating device having a casing with end walls spaced apart in substantially parallel relation. A pair of concentric shafts are rotatably mounted in one end wall of the casing, and within the casing a pair of spur gears are secured on these shafts in axial spaced relation, each gear being secured on a separate shaft. Also positioned in substantially parallel spaced relation within the casing are a pair of fixed ring gears, and intermeshed each between one of the ring gears and one of the spur gears are a pair of planetary gears. Each of the planetary gears is coupled to be moved by an actuating member which is slidably mounted within the casing for universal planar movement. The respective couplings between the actuating member and the planetary gears are such that each gear is moved in response to a different rectangular component of movement of the actuating member, or vice versa, the actuating member is moved in mutually perpendicular directions in response to movements of the planetary gears. Since the movement of either planetary gear causes a rotation of its associated spur gear and thus of the associated shaft, or conversely the rotation of either shaft causes a movement of the associated planetary gear, the rotation of the shafts are thus caused by or are the cause of separate rectangular components of the movement of the actuating member. In order to provide input or output means depending upon whether the device is employed to translate linear motion to rotary motion, or vice versa, a lever is mounted in the other end wall of the casing for universal movement and is connected to the actuating member.

The features of this invention which are believed to be novel and patentable are pointed out with particularity in the appended claims. The invention itself, however, both as to organization and mode of operation, together with additional objects and advantages thereof may be best understood by reference to the following description to be taken in conjunction with the accompanying drawing in which:

Fig. 1 is a cross-sectional view of a motion translating device embodying my invention; Fig. 2 is a view in partial section taken on the line 2—2 of Fig. 1; Fig. 3 is a sectional view taken on the line 3—3 of Fig. 2; Fig. 4 is a fragmentary cross-sectional view taken on the line 4—4 of Fig. 1; Fig. 5 is a fragmentary cross-sectional view taken on the line 5—5 of Fig. 1; and Fig. 6 is an exploded perspective view of a motion translating device similar in principle to that shown at Figs. 1-5.

Referring to Fig. 1, I have shown therein a motion translating device having a casing formed of a plurality of annular members which are secured by bolts 1 and pins 1a between a cup-shaped end wall 2 and a flat closure plate 3. The casing also includes an interior dividing wall 4 which separates end wall 2 from the various annular members. These annular members actually comprise a pair of gear rings 5 and 6 whose teeth extend inwardly toward the center of the casing, and a pair of spacing rings 7 and 8 which respectively provide clearance between the gear rings and between the lower gear ring and plate 3. In other words, the gear rings 5 and 6 are mounted in substantially parallel or axial spaced relation between dividing wall or plate 4 and closure or base plate 3.

The closure plate 3 is provided with an aperture 9 at its center point and extending through this aperture are a pair of concentric shafts 10 and 11. The outer shaft 10 has a toothed flange or spur gear 12 formed at its upper end within the casing, and mounted on inner shaft 11 between gear 12 and plate 4 is a spur gear 13. In other words, gears 12 and 13 are separately mounted on shafts 10 and 11 in axial spaced relation to each other.

Spur gears 12 and 13 are so mounted that gear 12 lies in the principal plane of ring gear 6 whereas spur gear 13 lies in the principal plane of ring gear 5. Between the spur and ring gears lying in the same plane there are positioned intermeshing planetary gears 14 and 15, gear 14 being in engagement with ring gear 5 and spur gear 13 and gear 15 being in engagement with ring gear 6 and spur gear 12. A guide member 16 is positioned between gear 15 and dividing plate 4 to prevent cocking and jamming of gear 15 against base plate 3. Guide member 16 is secured to plate 4 by a pair of screws 17 and has a bifurcated portion accommodating a vertically extending pin 18 which is mounted at its lower end in gear 15.

As shown, pin 18 extends upwardly from gear 15 through an arcuate slot 19 in plate 4 into a groove 20 formed in the lower surface of a slidable coupling member or plate 21 which is positioned above plate 4. Member or plate 21 is slidably movable with respect to plate 4 and is provided on its lower surface with a radially-extending key 22 which fits into a keyway 23 formed in the upper surface of plate 4. The interaction of key 22 with keyway 23 permits movement of plate 21 in one direction only, i. e., in the direction of the key and the groove. Plate 21 is thus mounted in the casing for linear movement in one direction only.

On its upper surface member 21 is provided with a key 24 which extends at right angles to the key 22 and fits into a keyway 25 formed in the lower surface of an actuating member 26 which is positioned between member 21 and end wall 2 of the casing. Member 26 is slidably movable on member 21, but the interaction of key 24 and keyway 25 limits the motion of member 26 relative to member 21 to one direction only, the direction of key 24 and keyway 25. However, since member 21 may move in a direction perpendicular to key 24, member 26 may also move in that direction. Thus by moving relative to member 21 in one direction and by moving with member 21 in the direction perpendicular thereto, member 26 may move in any direction in the plane perpendicular to the planes of section of Figs. 1 and 3. In other words, member 26 is mounted within the casing for universal planar movement.

Besides keyway 25, member 26 also has formed in its lower surface a groove 27 which extends at right angles to keyway 25. This groove 27 accommodates the upper end of a vertically-extending pin 28 which at its lower end is secured to the planetary gear 14. Intermediate member 26 and gear 14 the pin extends through an arcuate slot 29 in plate 4 and a substantially segmental recess 30 in member 21.

As is shown in Fig. 1 the groove 27 extends in the same direction as the key 22 formed on the lower surface of member 21 and thus pin 28 is moved by the walls of groove 27 only when member 26 is moved relative to member 21. Alternatively stated, pin 28 is moved only when the movement of member 26 contains a component perpendicular to groove 27 and key 22. Thus pin 28 is moved by a component of movement of plate 26 perpendicular to the component of movement which causes a movement of plate 21 and thus of pin 18. In other words, pins 28 and 18 are moved in response to separate perpendicular or rectangular components of movement of actuating member 26.

Whenever pin 18 or pin 28 is moved due to a movement of the actuating member 26, it of course causes a movement of the planetary gear to which it is connected. As is well known in the art, such a movement of a planetary gear between a fixed outer ring gear and a rotatable inner spur gear causes the inner spur gear to rotate. Thus spur gear 12 is rotated in response to a movement of pin 18 while spur gear 13 is rotated in response to a movement of pin 28. This means that each of the spur gears and thus each of the shafts 10 and 11 are rotated in response to a separate rectangular component of the movement of plate 26 or conversely rotation of either of the shafts causes a different rectangular movement of plate 26.

In order to provide input or output means depending upon whether the device is to be employed to translate linear motion to rotary motion, or vice versa, a universally mounted lever or "joy stick" 31 is connected to member 26. More specifically, lever 31 is provided with a pair of spherical journals 32 and 33 which are positioned respectively within spherical bearings 34 and 35 to form ball or universal pivots. Bearing 34 is fixedly mounted in casing member 2 while bearing 35 is similarly mounted in actuating member 26.

The manner in which the right angle components of movement of lever 31 are translated to rotary motion of the output shafts 10 and 11, or vice versa, may be best understood by reference to Fig. 6 which is an exploded view in perspective of a motion translating device having various members identical in function with those of the device shown in Figs. 1-5 but slightly different in form for clarity of illustration. The various parts of the device of Fig. 6 are designated by the same reference numerals as the corresponding parts of the device of Figs. 1-5. In Fig. 6 the device is shown as controlling the outputs of a pair of conventional selsyn generators 36 and 37, the rotor 38 of generator 36 being coupled to shaft 10 and the rotor 39 of generator 37 being coupled to shaft 11.

First, assuming that the motion of lever 31 is as indicated by the dotted lines in Fig. 1, i. e. is in the plane of section of Fig. 1, then plate 26 is slidably moved in the line of direction of groove 27 and thereby at right angles to the line of direction of keyway 25. This movement does not affect pin 28, but merely changes its position within groove 27. However, due to the engagement of key 24 with keyway 25, such a movement of plate 26 does result in a similar movement of plate 21. As plate 21 moves along with key 22 riding in keyway 23, pin 18 is also moved in the same direction by groove 20 so as to effect a movement of planetary gear 15. Gear 15, of course, because of its engagement with both ring gear 6 and spur gear 12, cannot move in a straight line but must necessarily move in an arcuate path. Thus, the unidirectional force applied to pin 18 from groove 20 results in gear 15 moving in an arcuate path, as is illustrated by the dotted lines in Fig. 5.

As gear 15 moves, it must also rotate due to its engagement with fixed ring gear 6, whereupon its rotation results in a rotation of spur gear 12, i. e. it turns gear 12. Gear 12, of course, drives shaft 10 so that any movement of pin 18 thus causes a turning of shaft 10. The direction of rotation of shaft 10 depends upon the direction of rotation of gear 15 and thus upon the direction of movement of pin 18 as actuated by lever 31 through plates 26 and 21. In other words, the direction of rotation of shaft 10 depends upon in which direction lever 31 is moved in the plane of section of Fig. 1. Similarly, the angular displacement of shaft 10 is dependent upon the magnitude of displacement of lever 31. Thus the angular displacement of shaft 10 from a predetermined neutral position is dependent in magnitude and direction upon the magnitude and direction of the displacement of lever 31 from the illustrated null position of Figs. 1-5, the displacement of lever 31, of course, being in the plane of section of Fig. 1.

Now, assume the movement of lever 31 to be at right angles to the above movement, i. e. to be in the plane of section of Fig. 3, so that it causes a movement of plate 26 also at right angles to the above movement. This movement, since it is at right angles to the line of direction of groove 27, causes a movement of pin 28; but since it is in the line of direction of keyway 25 and the engaging key 24, it does not cause any movement of plate 21. Even if there were sufficient friction between the plates to cause movement of plate 21, the engagement of key 22 with the keyway 23 in dividing wall 4 would prevent movement of plate 21.

The unidirectional force applied to pin 28 tends to move planetary gear 14 in a straight line. However, since it engages both gears 5 and 13, gear 14 can move only in an arcuate path as illustrated in Fig. 4. Therefore, the force applied to pin 28 results in an arcuate movement of both gear 14 and pin 28. Its engagement with ring gear 5 causes gear 14 to rotate while following this arcuate path, and its rotation in turn causes rotation of gear 13. Since gear 13 is mounted on output shaft 11, movement of gear 14 thus results in a rotation of shaft 11.

The direction of rotation of shaft 11 depends upon the direction of rotation of gear 14 and thus upon the direction of movement of pin 28 as actuated by lever 31 through plate 26. Thus movement of lever 31 in one direction in the plane of section of Fig. 3 causes angular displacement of shaft 11 in one direction while an opposite movement of lever 31 causes an angular displacemnet of shaft 11 in the opposite direction, the magnitude of angular displacement in either case being dependent upon the magnitude of lever movement. The return of lever 31 to the illustrated null position from displacement in either direction therefrom returns shaft 11 to a predetermined neutral position.

Thus far, it has been shown that shafts 10 and 11 are turned respectively in response to movements of lever 31 in a pair of planes lying at right angles to each other. However, lever 31, since it is mounted in universal pivots, may also be moved in planes intermediate these rectangular planes to cause simultaneous displacement of both shafts. Any such movement of lever 31 and thus of plate 26 causes simultaneous movement of both pins 18 and 28 and thereby a simultaneous movement of gears 14 and 15.

For example, assume lever 31 to be moved from its null position in any plane displaced from the aforesaid rectangular planes. Plate 26, since it is attached to lever 31, must also move in the same direction, but in order for it to do so a movement of both plates 26 and 21 is necessary. Since plate 26 can move with respect to plate 21 in one direction only while plate 21 can move only at right angles to that direction, a movement of both plates is obviously required to accomplish a movement of plate 26 in a direction lying intermediate the rectangular directions. In other words, plate 26 must not only move with respect to plate 21 but must also actuate and move with plate 21. Thus, the movement of lever 31 is, in effect, broken down into two right angle or rectangular components, the displacement of plate 26 with respect to plate 21 being indicative of the size of one component and the displacement of plate 21 itself being indicative of the size of the other component.

For movement of lever 31 in a plane displaced $n$ degrees from the plane of section of Fig. 1, i. e. for a movement of plate 26 in a direction displaced $n$ degrees therefrom, the movement of plate 21 is equal to the cosine of $n$ degrees times the total movement of plate 26 and the movement of plate 26 with respect to plate 21 is equal to the sine of $n$ degrees times its total movement. Of course, the direction of movement of pltaes 26 and 21 depends upon the direction of movement of lever 31 in the aforesaid plane. As before, the movement of plate 21 causes a movement of pin 18 resulting in a rotation of shaft 10 whereas the movement of plate 26 with respect to plate 21 causes a movement of pin 28 resulting in a rotation of shaft 11, the direction of rotation in either case depending upon the direction of movement of the associated pin.

Thus, shaft 10 is displaced in response to the movement of lever 31 in a predetermined direction from its null position or to any component of lever movement lying in that direction, whereas shaft 11 is displaced in response to lever movement or any component thereof lying at right angles to the above predetermined direction. In other words, a displacement of rotor 38 from the illustrated null position is dependent upon one rectangular component of movement of lever 31, while a displacement of rotor 39 is dependent upon the other rectangular component of movement. This permits the use of generators 36 and 37 as the actuating means in two electrical circuits for energizing various positioning means, such as servo devices, in response to the rectangular components of lever movement. For example, these generators could be very advantageously used as the actuating means in the aileron and elevator channels of the maneuvering control system of an autopilot.

I have described the operation of the illustrated device with reference to applications in which rotary movement of a pair of output shafts is desired in response to a linear movement of an actuating lever or "joy stick." However, it should be obvious that it is also possible by means of my invention to obtain a linear movement of a universally mounted lever in response to a rotational input on a pair of rotatable shafts; for example, the illustrated embodiment may be run backwards.

Further it should be understood that among the modifications of the illustrated device, I contemplate a device in which the coupling member 21 is omitted. In such a device both planetary gears would be coupled directly to the actuating member 26, each to be moved in response to a separate rectangular component of its planar movement. An example of suitable coupling means would be pins mounted at their one ends on the planetary gears and extending at their other ends into mutually perpendicular grooves formed on the single actuating member.

Thus, while in accordance with the patent statutes, I have described what at present is considered to be the preferred embodiment of my invention, it will be obvious to those skilled in the art that numerous alterations and modifications may be made therein without departing from the invention, and I, therefore, aim in the appended claims to cover all such alterations and modifications as fall within the true spirit and scope of this invention.

What I claim as new and desire to secure by Letters Patent of the United States is:

1. A motion translating device comprising a housing having spaced apart end walls, a pair of ring gears fixedly mounted in substantially parallel spaced relation in said housing, a pair of concentric shafts rotatably mounted on one of said end walls, a pair of spur gears separately mounted on said shafts in axial spaced relation within said housing, a pair of planetary gears each mounted in intermeshing relation with one of said ring gears and one of said spur gears, an actuating member slidably mounted in said housing for universal planar movement, coupling means connecting said actuating member selectively to move one of said planetary gears in one direction and to move the other of said planetary gears in a direction perpendicular to said one direction, and a lever pivotally mounted on said housing for universal movement and connected to said actuating member.

2. A motion translating device comprising a housing, a pair of ring gears fixedly mounted in said housing, a pair of shafts rotatably mounted on and extending into said housing, a pair of spur gears each mounted on one of said shafts within said housing, a pair of planetary gears mounted within said housing each in intermeshing relation between one of said spur gears and one of said ring gears, an actuating member slidably mounted in said housing for universal planar movement, coupling means connecting said actuating member selectively to move one of said planetary gears in one direction and to move the other of said planetary gears in a direction perpendicular to said one direction, and a lever pivotally mounted on said housing for universal movement and connected to said actuating member.

3. A motion translating device comprising a housing having spaced apart end walls, a pair of ring gears fixedly mounted in substantially parallel spaced relation in said housing, a pair of concentric shafts rotatably mounted on one of said end walls, a pair of spur gears separately mounted on said shafts in spaced axial relation within said housing, a pair of planetary gears each mounted in intermeshing relation with one of said ring gears and one of said spur gears, an actuating member slidably mounted in said housing for universal planar movement, and coupling means connecting said actuating member selectively to move one of said planetary gears in one direction and to move the other of said planetary gears in a direction perpendicular to said one direction.

4. A motion translating device comprising a housing, a pair of ring gears fixedly mounted in said housing, a pair of shafts rotatably mounted on and extending into said housing, a pair of spur gears each mounted on one of said shafts within said housing, a pair of planetary gears mounted within said housing each in intermeshing relation between one of said spur gears and one of said ring gears, an actuating member slidably mounted in said housing for universal planar movement, and coupling means connecting said actuating member selectively to move one of said planetary gears in one direction and to move the other of said planetary gears in a direction perpendicular to said one direction.

5. A motion translating device comprising a housing, a pair of ring gears fixedly mounted within said housing, a pair of shafts rotatably mounted on and extending into said housing, a pair of spur gears each mounted on one of said shafts within said housing, a pair of planetary gears mounted in said housing each in intermeshing relation between one of said spur gears and one of said ring gears, a coupling member slidably mounted within said housing for linear movement in one direction, first coupling means connecting said coupling member to one said planetary gear, an actuating member mounted in said housing for universal planar movement, second coupling means connecting said actuating member to said first coupling member for movement in said one direction, third coupling means connecting said actuating member to move with the other of said planetary gears in a direction perpendicular to said one direction, and a lever pivotally mounted on said housing for universal movement and connected to said actuating member.

6. A motion translating device comprising a casing having spaced apart end walls, a pair of ring gears fixedly mounted in substantially parallel spaced relation in said casing, a pair of concentric shafts rotatably mounted in one of said end walls, a pair of spur gears separately mounted on said shafts in spaced apart relation within said casing, a pair of planetary gears each mounted in intermeshing relation with a different one of said spur gears and a different one of said ring gears, a coupling member slidably mounted in said casing for linear movement in one direction and provided with a groove extending perpendicular to said one direction, an actuating member slidably mounted in said casing for universal planar movement and provided with a groove extending in said one direction, a pair of pins each mounted on one of said planetary gears and each extending into one of said grooves, key means connecting said actuating member to move with said coupling member in said one direction, and a lever pivotally mounted in the other wall of said housing for universal movement and connected to said actuating member.

7. A motion translating device comprising a housing having spaced-apart end walls in substantially parallel spaced relation, a pair of fixed ring gears mounted in said housing in substantially parallel spaced relation between said walls, a pair of concentric shafts rotatably mounted in one of said walls, a pair of spur gears separately mounted on said shafts within said housing in axial spaced relation, a pair of planetary gears mounted in said housing each in intermeshing relation between one of said spur gears and one of said ring gears, a coupling member slidably mounted within said housing for linear movement in one direction, first coupling means connecting said coupling member to one of said planetary gears, an actuating member slidably mounted in said housing for universal planar movement, second coupling means connecting said actuating member to move said coupling member in said one direction, third coupling means connecting said actuating member to move the other of said planetary gears in a direction perpendicular to said one direction, and a lever pivotally mounted in the other wall of said housing for universal movement and connected to said actuating member.

8. A motion translating device comprising a housing, a plate member fixedly mounted within said housing, a pair of ring gears fixedly mounted within said housing, a pair of shafts rotatably mounted on and extending into said housing, a pair of spur gears each mounted on one of said shafts within said housing, a pair of planetary gears mounted in said housing each in intermeshing relation between one of said spur gears and one of said ring gears, a coupling member slidably mounted in said housing, key means connecting said plate member and said coupling member to limit the movement of said coupling member to linear movement in one direction, first coupling means connecting said coupling member to one said planetary gear, an actuating member mounted on said housing for universal planar movement, second coupling means connecting said actuating member to move with said coupling member in said one direction, third coupling means connecting said actuating member to move with the other said planetary gear in a direction perpendicular to said one direction, and a lever pivotally mounted on said housing for universal movement and connected to said actuating member.

9. A motion translating device comprising a housing having spaced apart end walls, a fixed member mounted in said housing intermediate said end walls, a pair of ring gears fixedly mounted in substantially parallel spaced relation in said housing, a pair of concentric shafts rotatably mounted on one of said end walls, a pair of spur gears separately mounted on said shafts in spaced axial relation within said housing, a pair of planetary gears each mounted in intermeshing relation with one of said ring gears and one of said spur gears, a coupling member slidably mounted in said casing, key means connecting said fixed member and said coupling member to limit the movement of said coupling member to linear movement in one direction, first coupling means connecting said coupling member to one said planetary gear, an actuating member slidably mounted in said casing for universal planar movement, key means connecting said actuating member to move with said coupling member in said one direction, second coupling means connecting said actuating member to move with the other said planetary gear in a direction perpendicular to said one direction, and a lever pivotally mounted on said housing for universal movement and connected to said actuating member.

BARTON H. SNOW.

No references cited.